June 7, 1966　　　　　A. SCHERER　　　　　3,254,749
AUTOMATIC SELF-SERVICE MECHANISMS FOR DISPENSING
MERCHANDISE, FOR EXAMPLE, FUEL AND/OR OIL
AND GREASE FOR MOTOR VEHICLES
Filed Oct. 9, 1961　　　　　　　　　　　　12 Sheets-Sheet 8

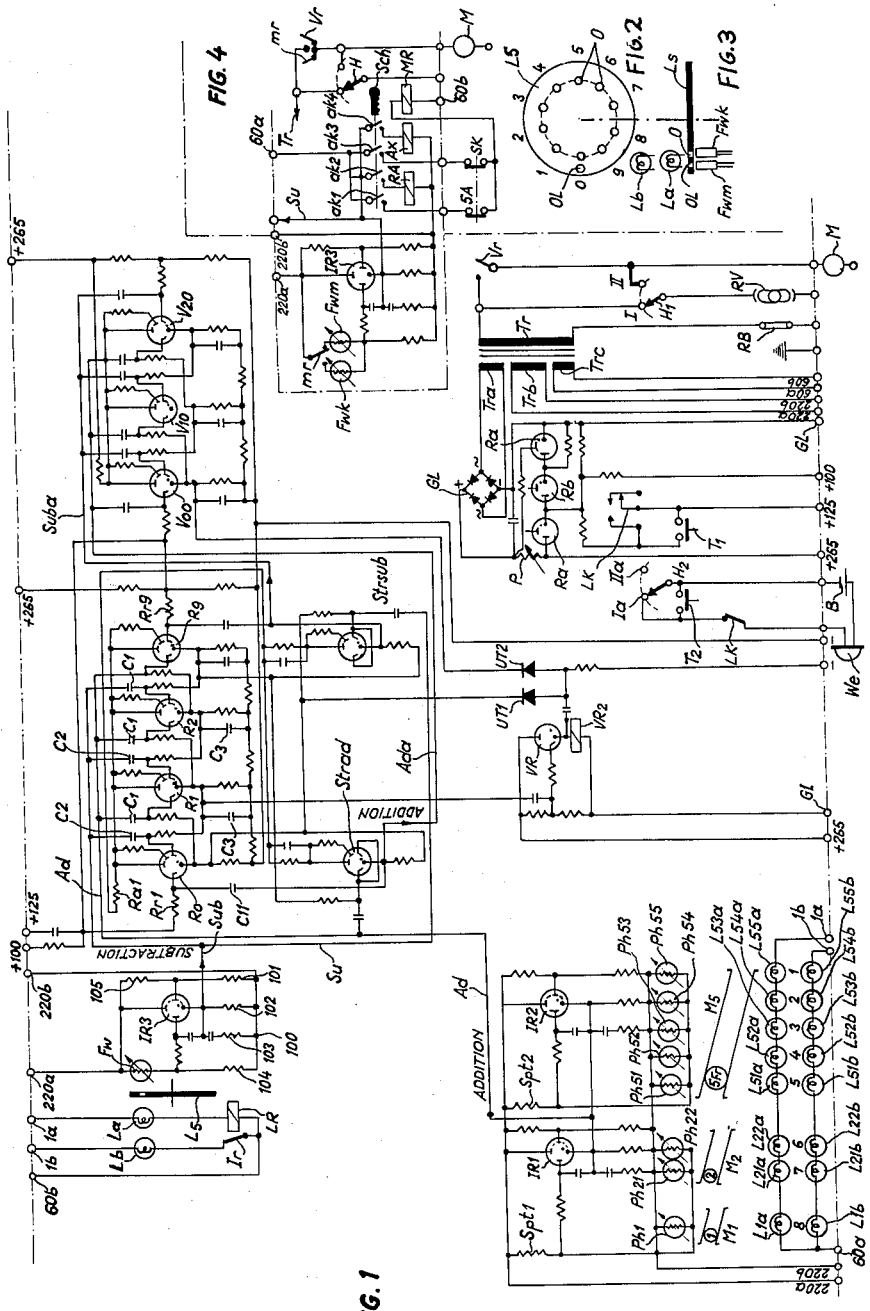

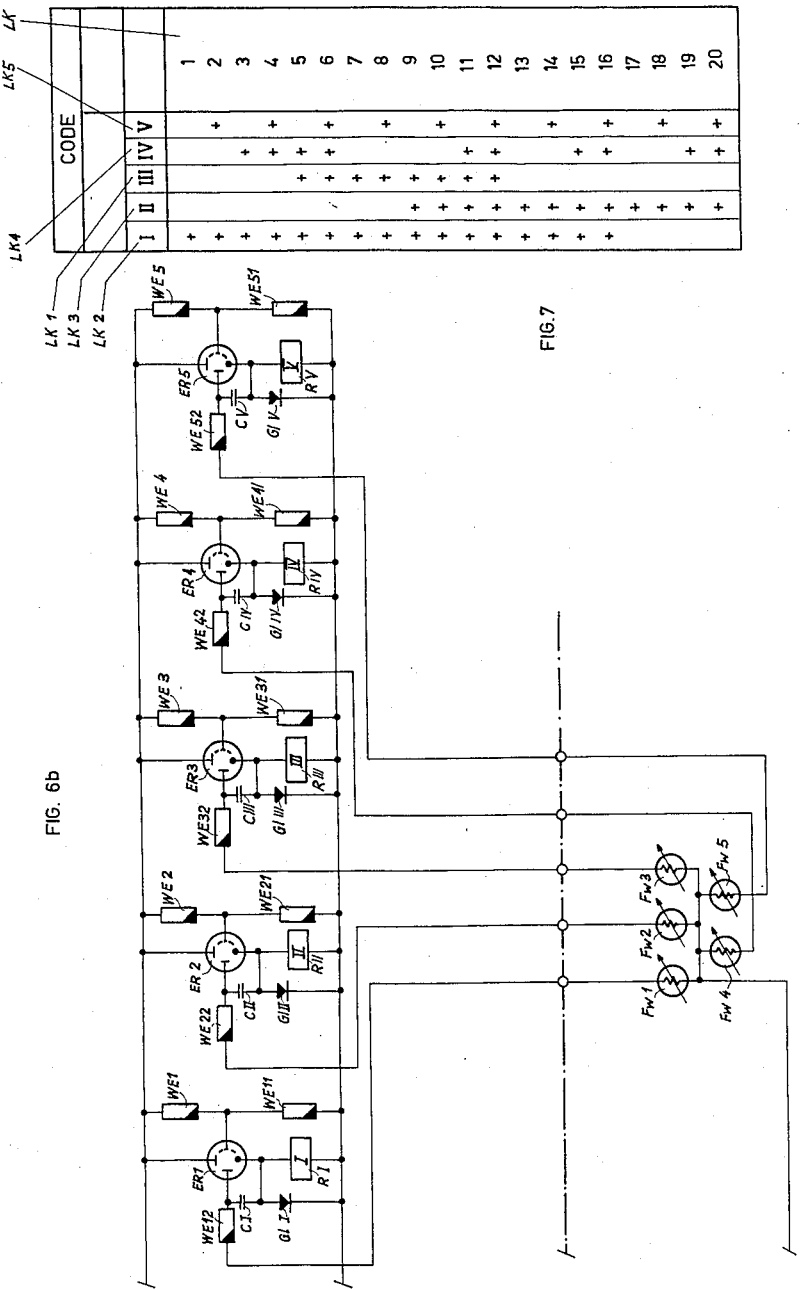

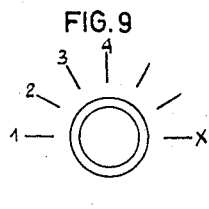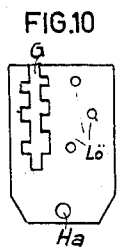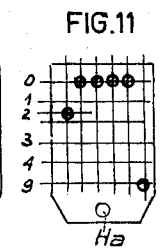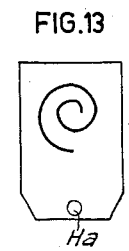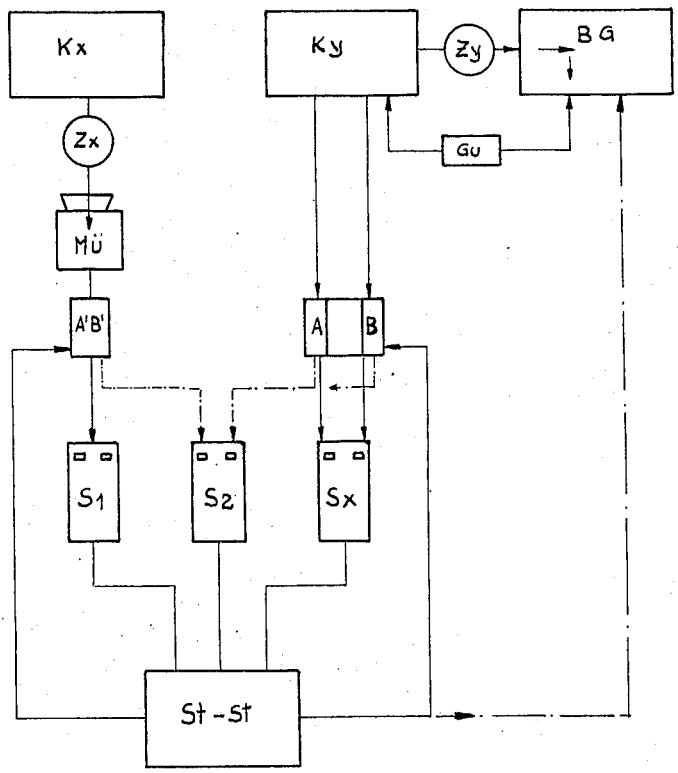
FIG.14

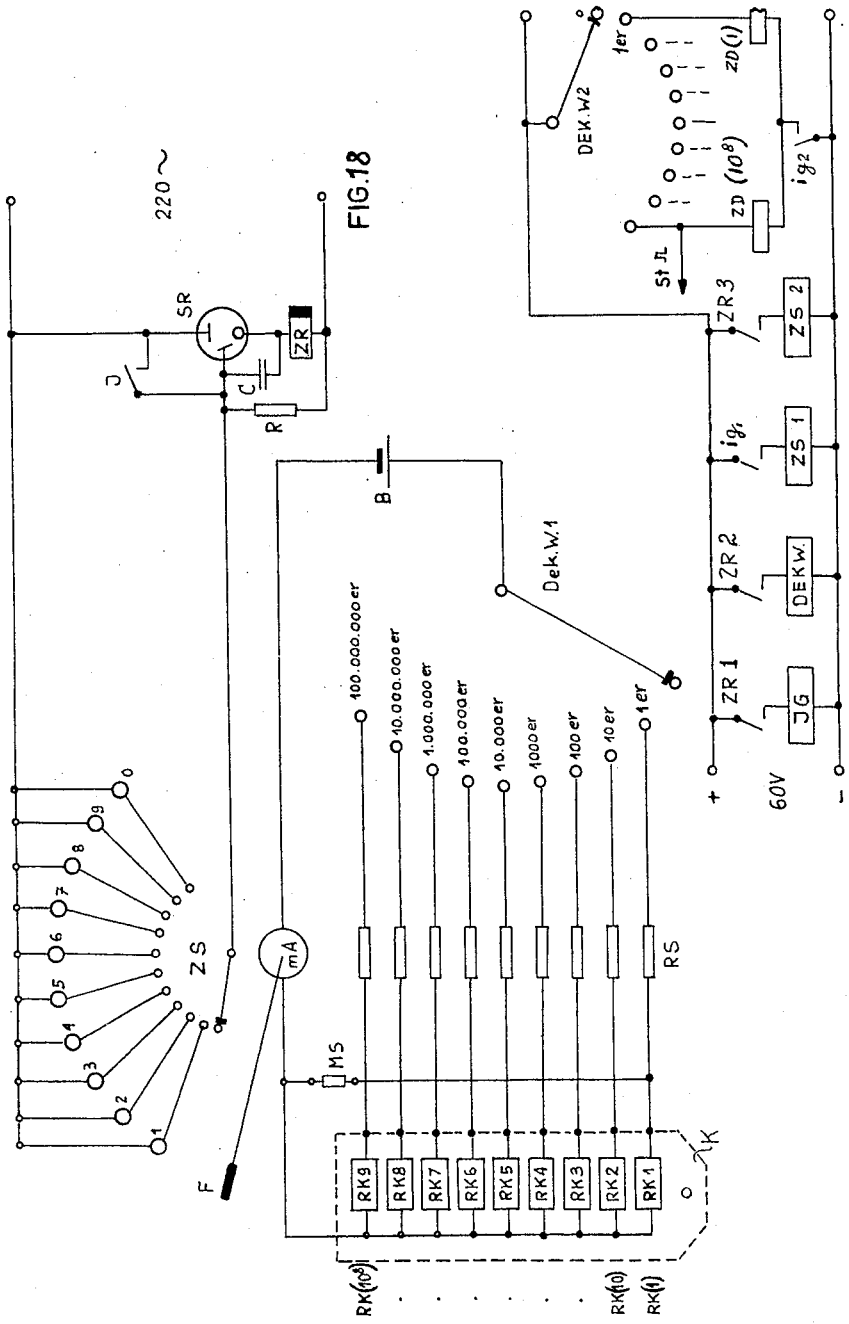

| Digit No. | UNITS RK(1) [(RS(1)=0Ω)] | TENS RK(10) [(RS(10)=10K)] | HUNDREDS RK(100) [(RS(100)=47K)] | THOUSANDS RK(1000) [(RS(1000)=68K)] |
|---|---|---|---|---|
| 1 | 100 K | 90 K | 95,3K | 93,2K |
| 2 | 90 K | 80 K | 85,3K | 83,2K |
| 3 | 80 K | 70 K | 75,3K | 73,2K |
| 4 | 70 K | 60 K | 65,3K | 63,2K |
| 5 | 60 K | 50 K | 55,3K | 53,2K |
| 6 | 50 K | 40 K | 45,3K | 43,2K |
| 7 | 40 K | 30 K | 35,3K | 33,2K |
| 8 | 30 K | 20 K | 25,3K | 23,2K |
| 9 | 20 K | 10 K | 15,3K | 13,2K |
| 0 | 10 K | 0 K | 5,3K | 3,2K |

FIG.18a

United States Patent Office 3,254,749
Patented June 7, 1966

3,254,749
AUTOMATIC SELF-SERVICE MECHANISMS FOR DISPENSING MERCHANDISE, FOR EXAMPLE, FUEL AND/OR OIL AND GREASE FOR MOTOR VEHICLES
Albert Scherer, Meggen, Lucerne, Switzerland
Filed Oct. 9, 1961, Ser. No. 147,384
Claims priority, application Switzerland, Oct. 17, 1960, 1,163/60; Sept. 6, 1961, 10,309/61; Sept. 11, 1961, 10,519/61
4 Claims. (Cl. 194—4)

This invention relates to automatic self-service mechanisms for dispensing merchandise, for example, fuel, oil or grease for motor vehicles, having means for determining the quantity and value of the dispensed merchandise along with test means which are, at least temporarily, to be inserted in the mechanisms to determine the identity, and qualifications, of the particular purchaser.

Fuel-dispensing mechanisms, operable upon insertion of coins into a coin collector or on actuation of a special lock by a special key, are well known. The known machines are of the type in which various elements are mechanically coupled to each other so that they must be installed on dispensing posts. In the coin collectors heretofore utilized there is no optical control or any other control indicating proper or improper functioning of the mechanism. Furthermore, the known systems generally involve complicated and expensive mechanisms.

The mechanisms according to the instant invention, in order to eliminate the above disadvantages of prior mechanisms, differentiates therefrom in that, in combination with means for determining the quantity and value of the dispensed material and checking the test means, electronic devices are provided which by scanning the magnitudes store them at least temporarily in a storage element having cooperating read-out means by which the read-out orders are applied to a control member which actuates the particular means producing the required operation, such as the metering of the merchandise and also the dispensing or refusal to dispense the merchandise in accordance with the recognition or nonrecognition of the qualifications of the prospective purchaser.

Specifically, the control member includes an electronic or electromechanical pulse generator which generates an appropriate number of pulses dependent on the values of the quantity and cost of the merchandise, and applies them to at least one electronic, electric or electromechanical computer. Furthermore, another electric or electromechanical pulse generator, controlled by a counting mechanism at the merchandise-dispensing point, transmits its pulses to the same or to another computer so that it is possible to withdraw merchandise at several regions.

The invention, together with its features, aspects and objects, will be more readily understood by the following description of an illustrative embodiment when read in conjunction with the accompanying drawing in which:

FIG. 1 shows a circuit arrangement of the mechanism provided with two pulse generators and having an electronic computer for forward and reverse metering;

FIGS. 2 and 3 respectively show a detail in a plane and a sectional view;

FIG. 4 shows a mechanical tester provided with scanning means;

FIG. 5 discloses the circuit of an electronic tester for scanning a perforated card;

FIGS. 6a and 6b show a modified scanner for use with perforated cards or perforated tapes;

FIG. 7 shows a perforated tape for use with the scanning means of FIGS. 6a and 6b, having twenty differing variations in configuration;

Figure 15:
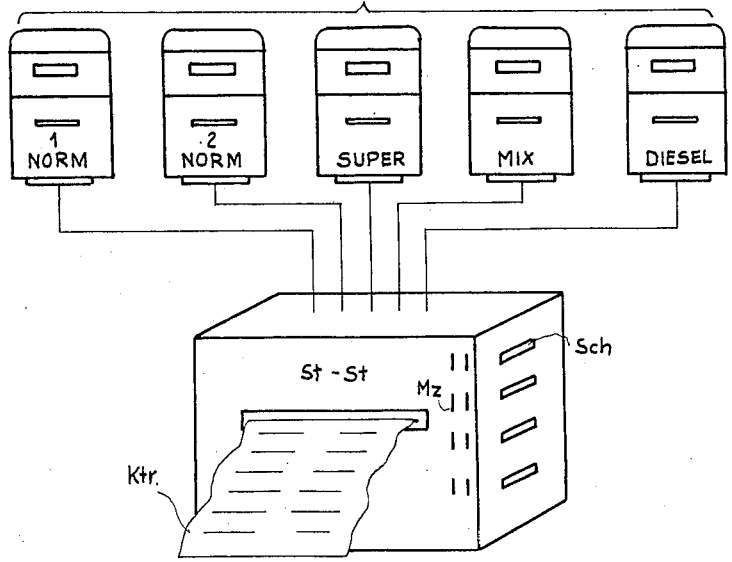
Figure 16:
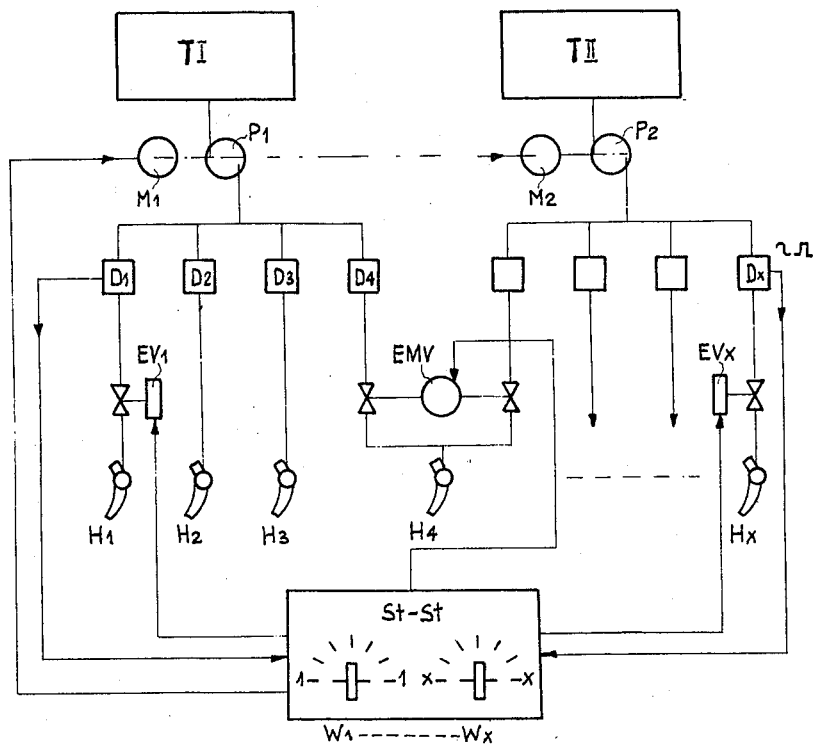
Figure 17:
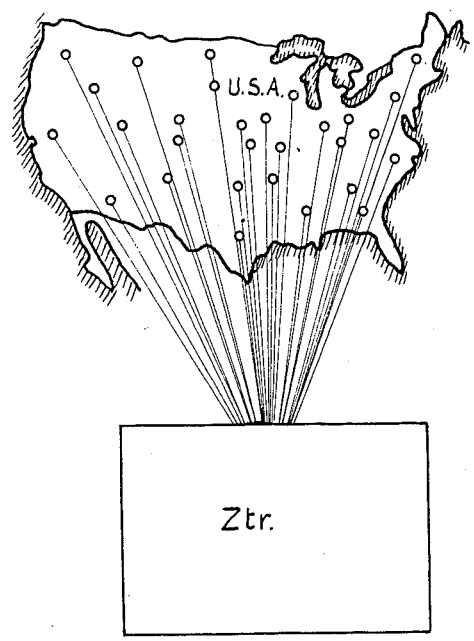
Figure 19:
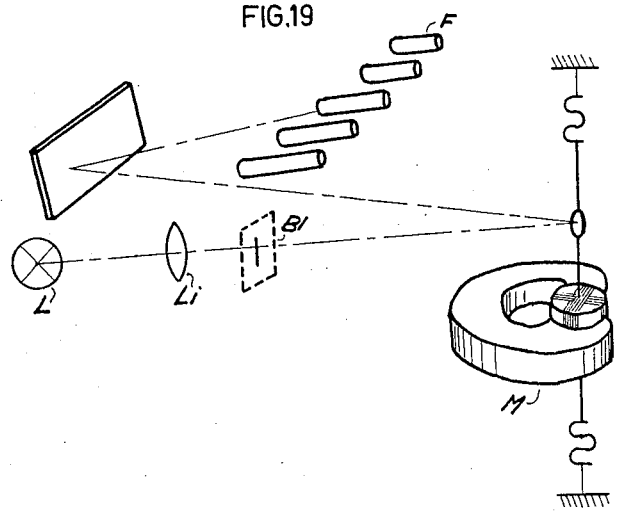
Figure 20A:
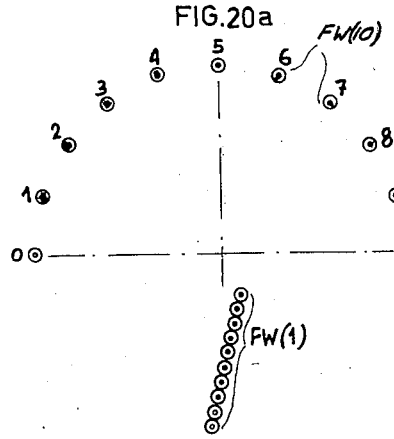
Figure 20:
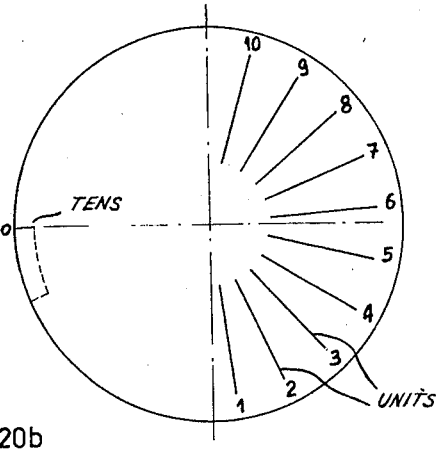
Figure 21:
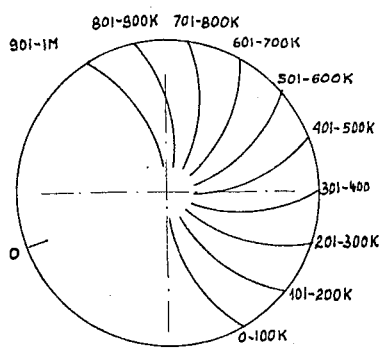

FIGS. 9 through 13 schematically show further embodiments of testing means;

FIGS. 14 to 16 disclose three additional illustrative embodiments of the mechanism according to the invention in schematic form;

FIG. 17 is a diagrammatic view of the spatial distribution of different electronic stations in accordance with the invention;

FIG. 18 is a diagram of an electrical circuit for performing the scanning steps and for examining the test means, as well as other control sequences, in the self-service mechanism shown by way of example;

FIG. 18a is a table showing the arrangement of the code resistors;

FIG. 19 shows the measuring devices required for the installation of FIG. 18, represented schematically and by way of illustrative example; and FIGS. 20 and 21 schematically show two illustrative embodiments of the scanning scales of the indicating devices according to the invention;

FIGS. 20a, 20b, 21a and 21b shows an arrangement of photoelectric cells, a circuit for photoelectric cells, a further embodiment of an indicating means, and a still further embodiment of an indicating means, respectively.

The self-service installation of FIG. 1 comprises a current source in the form of a line transformer $Tr$ connected to the A.C. supply line and having three secondary windings $Tra$, $Trb$ and $Trc$. For connecting and disconnecting the transformer, and arm H1 of a manually operated switch H1, H2 is provided in the primary circuit thereof. A dry rectifier G1 is connected to secondary winding $Tra$ in a single-phase Graetz circuit whose positive pole is connected by a conductor and a potentiometer P to a +265 terminal. The negative pole of the rectifier is connected by a lead to terminal —G1, and across terminals +265 and —G1 a reference-potential tube VR is connected.

The anode of an amplifier tube $Ra$ is connected by way of potentiometer P to the positive pole of rectifier G1, the cathode of the amplifier tube being connected to the anode of a second tube $Rb$ whose cathode is connected to the anode of a third amplifier tube $Rc$ having its cathode connected to the minus pole of rectifier G1. The tubes $Ra$, $Rb$ and $Rc$ are of the gas-filled type having constant voltages. Another conductive connection by way of a resistor is made from the minus pole of the rectifier to the anode of tube $Rc$ as also to the cathode of tube $Rb$, and, similarly, a conductive connection extends by way of a resistor to the cathode of tube $Ra$ and the anode of tube $Rb$, a lead being branched from the latter connection to a contact of a key T by way of a resistor. A lead including a resistor is branched from the connection between the cathode of tube $Ra$ and the anode of tube $Rb$ and is connected to a +100 terminal. On actuation of key T1, a contact thereof is connected to a lead which is connected to a +125 terminal and goes to lamp-control contacts $lk$ of a relay LR. There is also provided a second key T2 for short-circuiting two leads of which one connects a contact $Ia$ of an arm H2 of manual switch H1, H2 by way of a lamp-control contact $Lk$, to an alarm $We$, while the other connects the manual switch to the positive pole of a battery whose negative side is connected to alarm $We$, so that the alarm, on actuation of switch or key T2, emits an acoustic signal when contact $lk$ is closed by relay LR. Manual switch H1, H2 is provided to switch the equipment to automatic operation when in position I, Ia and to manual operation when in position II, IIa, the switch arm H1 in position II connecting one of the supply-line leads via a reference-potential tube RV with a line connected to a drive motor M and to a contact $vr$ of a relay VR2. Thus, with energization of a tube RB, motor M is connected to line transformer Tr provided relay VR2 has closed its contact $vr$ upon insertion of a coin.

The anode of a reference-voltage tube VR is connected, by way of terminal +265 and potentiometer P, to the positive pole of rectifier G1, while the cathode of this tube is connected by way of relay VR2 with terminal —G1, i.e. with the negative pole of rectifier G1. Two resistors are connected in series between the anode of tube VR and terminal —G1, and the control electrode of tube VR is connected by a resistor to the function of the series-connected resistors.

Secondary winding $Trb$ of transformer Tr is connected to two terminals, 220$a$ and 220$b$. To terminal 220$a$ are connected two parallel-connected variable voltage dividers $Spt1$ and $Spt2$, the parallel-connected anodes of two tubes IR1 and IR2 of a pulse generator, and two parallel-connected resistors connected to auxiliary electrodes of the tubes. The aforementioned elements are parts of a coin collector provided with three coin chutes M1, M2 and M5 for receiving coins of predetermined value. For example, one-franc coins are insertable in chute M1, two-franc pieces in chute M2, and five-franc pieces in chute M5. Obviously, the coin collector can be provided with chutes for receiving coins of other denominations. A light-responsive photoresistor $Ph1$ and two glow lamps L1$a$ and L1$b$ are positioned in coin chute M1. Disposed in coin chute M2 are two photoresistors $Ph21$ and $Ph22$ and two lamps L22$a$, L22$b$ and L21$a$, L21$b$, respectively, cooperating therewith, while in coin chute M5 five photoresistors $Ph51$, $Ph52$, $Ph53$, $Ph54$ and $Ph55$, each with two cooperating lamps L51$a$ and L51$b$, ... L55$a$ and L55$b$, are positioned. The photoresistors, which function in cooperation with tubes IR1 and IR2 of the pulse generator, may be replaced by contacts which transmit the pulses to the computer. Lamps L1$a$, L21$a$, L22$a$, L51$a$, L52$a$, L53$a$, L54$a$ and L55$a$ are in series and connected between terminals 60$a$ and 1$a$, whereas series-connected lamps L1$b$, L21$b$, L22$b$, L51$b$, L52$b$, L53$b$, L54$b$ and L55$b$ are connected between terminals 60$a$ and 1$b$. An additional lamp L$a$ is connected in a circuit extending from terminal 1$a$ by way of the winding of a relay LR to a contact 60$b$. Terminal 1$b$ is connected to a lamp L$b$ which is likewise connected to terminal 60$b$ over a contact 10 of relay LR to terminals 60$a$ and 60$b$ are connected across secondary winding $Trc$, A.C. current is supplied to the lamps by that winding. As a coin rolls through chute M1, the photoresistor of the chute is illuminated once. If, however, a coin is inserted in chute M2, each of its photoresistors is illuminated once, resulting in two pulses; and, similarly, a coin fitting in chute M5 results in five pulses. The pulses are transmitted to an electronic computer as below described.

One terminal of photoresistors $Ph1$, $Ph21$, $Ph22$, $Ph51$, $Ph52$, $Ph53$, $Ph54$ and $Ph55$ is connected to a lead connected to terminal 220$b$. The other terminals of photoresistors $Ph1$, $Ph21$ and $Ph22$ are connected to the voltage divider $Spt1$, and those of the other photoresistors $Ph51$ to $Ph55$ are joined to the other voltage divider $Spt2$. A branch connection extends from the junction between voltage divider $Spt1$ and the photoresistors of coin chutes M1 and M2 through a resistor to a control electrode of tube IR1, and similarly the second voltage divider $Spt2$ is connected via a resistor to a control electrode of tube IR2. The cathode of tube IR1 is connected to the cathode of tube IR2 and to a line $Ad$, two additional branch connections leading via respective resistors from the interconnected cathodes to terminal 220$b$. In addition, two further lines branch off the common cathode lead and are respectively connected, via capacitors to the control electrodes of tubes IR1 and IR2, two RC series circuits extend in parallel from this lead to terminal 220$b$.

A line 100 joining four resistors 101, 102, 103, 104 in parallel is likewise connected to terminal 220$b$. Resistor 101 is connected via another resistor 105 to terminal 220$a$. The junction of the two series-connected resistors 101, 105 is tied to the auxiliary electrode of a pulse-generator tube IR3, whose anode is connected with terminal 220$a$ while its cathode is connected to the resistor 102 and to a line $Sub$. There is also a connection, including a capacitor in series with resistor 103 between lines 100 and $Sub$, the latter line being further connected by way of another capacitor with the control electrode of tube IR3, while the line 100 is connected via a photoresistor F$w$ and resistor 104 to terminal 220$a$ and to the anode of tube IR3. Between lamps L$a$ and L$b$ and photoresistor F$w$ there is disposed a perforated disc L$s$ having ten perforations 0, 1, 2 ... 9 lying on a circle centered on the axis of rotation of the disc (FIG. 2). Outwardly of this circle of perforators on a common radius with perforation 0, there is a further aperture 01 (FIGS. 2 and 3). On the side of disc L$s$ opposite lamp L$a$ there is a photoresistor F$wm$ and alongside thereof, behind aperture "0," photoresistor F$wk$ (FIG. 3).

The arrangement further includes a ten-stage cold-cathode-tube counting ring, for advance and reverse counting, connected to the pulse generators. This counting ring has ten cold-cathode tubes R0, R1 ... R9, each with two control electrodes. In addition, in the embodiment of FIG. 1, three further cold-cathode tubes V$oo$, V10 and V20, each with two control electrodes, are provided the number of these latter tubes being augmentable if required. Also provided are a tube S$trad$ and a tube S$trsub$ of the same tube type. For advance counting the pulses from one of the pulse generators are applied by way of line $Ad$ to the counting ring, line $Ad$ being connected to the left-hand control electrodes of tubes R1, R2 ... R9 by way of capacitors C1. The right-hand control electrodes of tubes R$o$, R1, R2 ... R9 are connected by a capacitor 02 to the output line $Su$ of one pulse generator. The left-hand control electrode of tube R$o$ is connected through a resistor R$r1$ and an added resistor with terminal +100, and by a capacitor parallel to the last-mentioned resistor with a +125 terminal, as also by way of a capacitor C11 to an output lead $Ada$ to which the cathode of tube S$trad$ is also connected. The right-hand control electrode of tube R9 is connected by a resistor R$o9$ to terminal +265 and by a capacitor to an output line $Suba$, to which the cathode of tube S$trsub$ is also connected. The anodes of tubes R$o$, R1, R2 ... R9 are connected to a line to which the auxiliary electrodes of the tubes are each connected by an individual resistor, this line being connected by a resistor R$a1$ as well as individual further resistors with the anodes of tubes S$trad$ and S$trsub$, and by other individual resistors to the auxiliary anodes thereof. The right-hand control electrode of the tube R$o$ is furthermore connected by a resistor to the cathode of tube R1 whose right-hand control electrode is connected by a resistor with the cathode of tube R2, etc. The cathode of tube R$o$ also is connected by a resistor to the cathode of tube S$trad$ and has a further connection with the right-hand control electrode of tube S$trsub$ as well as by a capacitor and a resistor to the control electrode of tube VR, whose cathode in addition to its connection to relay VR2 is also connected to a capacitor in parallel to two half-wave rectifiers UT1 and UT2. From rectifier UT2 a connection including a resistor goes to terminal —G1 and another connection extends to the cathode of tube V$oo$, while from rectifier UT1 a connection goes to the cathode lead of tube R$o$. In addition, the cathode of tube R$o$ is connected by two series resistors to terminal +265, and other connections containing resistors are provided to the cathodes of tubes R1, R2 ... R9.

Tubes V$oo$, V10, V20 of the computer are in like circuits containing like circuit elements, such as capacitors and resistors, as are tubes R1 ... R9, and are connected to the portions of the computer containing the latter by connectors A*da* and S*uba*.

The cold-cathode counting stages may also include transfer stages. They may also be of the binary type, and for advance and reverse counting two separate counting chains may be used instead of the cold-cathode counting rings, both of the chains performing additive computations only. That is, one counting chain may be connected with the pulse generator composed of tubes IR1 and IR2, and the other counting chain with the pulse generator consisting of tube IR3. In such case, the circuit is to be such that the total result is nevertheless correct. This modification is of importance and to be used when circuit elements other than cold-thyratrons, for example transistors, are to be used.

The operation of the above-described circuit arrangement is as follows:

When manual switch H1, H2 has been switched to position I, I*a*, corresponding to automatic operation, lamps L1*a*, L21*a*, L22*a* ... L55*a* are in circuit inasmuch as terminals 1*a* and 60*a* of the series-connected lamps are connected to the secondary winding T*rc* of transformer T*r*, lamp L*a* and relay LR being included in this lamp circuit. Relay LR, which constitutes the control means for the lamps, is actuated and by its contact *lk* fires tubes R*o* and V*oo* by a pulse and these tubes are thus energized. Simultaneously, by an additional contact LK, the alarm circuit through alarm W*e* is broken. As soon as a coin is inserted in the coin collector, that is into one of coin chutes M1, M2 and M5, the impulse generator transmits the so formed and amplified pulses of the energized photoresistors P*h*1, P*h*21, P*h*22 ... P*h*55 over line A*d* to the computer. Specifically, if a coin is inserted in the M1 chute, a single pulse is generated; whereas on insertion of a coin in chute M2 two pulses are generated while on such insertion in chute M3 five pulses are generated.

Energized tube R*o* on its part, by a potential drop acting on the left-hand control electrode of tube R1, prepares the connection in response to a received pulse which is applied to the computer from the pulse generator over line A*d*. If relay LR is operated, or if key T1 is actuated, tube V*oo* is energized over contact *lk* or key T1 together with tube R*o*, which in turn prepares for the connection of tube V10 into the circuit. The first pulse of current thus causes tube R1 to be energized by way of its left-hand control electrode while all other tubes are extinguished, that is, non-conductive. In the cathode resistor of the energized tube a potential drop is thus produced which is transmitted, firstly, to the left-hand control electrode of tube R2 and, secondly, to the right-hand control electrode of tube R*o*. In this manner, both control electrodes are brought to a potential lying somewhat below their striking potential, whereas all the other control electrodes are at cathode potential. If now an additional pulse be applied, over the capacitors in line A*d*, to the left-hand control electrodes, whose potential is likewise below the ignition potential of the tubes, only tube R2 is energized, that is, only that tube whose left-hand control grid has previously been biased. Capacitors C3 together with the anode resistor common to all the tubes assure that tube R1 will be extinguished. By a pulse which is applied to the computer on energization of tube R*o*, tube V10 is similarly energized and tube V*oo* is disconnected. So also with the energization of tube R1, tube VR is energized via its control electrode, tube VR remaining energized when tube R1 is extinguished. Tube VR actuates relay V*r*2 which closes its contact *vr*, thus connecting motor M in the circuit which drives the pump for the fuel oil or other pumps.

As has been mentioned, tube V*oo* was energized simultaneously with tube R*o* since its left-control electrode is connected by lead A*da* with the left-hand control electrode of tube R*o*. Inasmuch as the portion of the computer including tubes R1 ... R9 has ten computer tubes, tube V*oo* remains energized when the number of coins inserted in chute M1 does not exceed nine in number. Tube VR remains energized until, after the transmission of pulses to the computer, tubes R*o* and V*oo* are again energized by subtraction pulses from generator IR3. The reverse counting or subtraction takes place in that a pulse is applied by way of the capacitor to the right-hand control electrodes of each tube, whereby tubes R*o* and V*oo* are energized while tubes R1 and V10 are deenergized. Depending on which input a counting pulse is applied to, the counting ring is advanced one digit or is driven back one digit.

The computer may also so operate that by the coin-controlled pulse generator a preselection may automatically be carried out in the computer. If the number 10 is reached by the computer, the motor M is likewise set at 0. This is particularly of practical importance when transistors are used in a decimal or binary circuit.

The portion of the computer with tubes V*oo*, V10 and V20 functions as a decimal counter in which V*oo* is provided for the first decade, i.e. for the numbers 0 to 9; tube V10 for the second decade, that is, for numbers 10 to 19; and tube V20 for the third decade 20 to 29; it will be understood that the number of decades may be increased to meet requirements. What is required is the transmission of the tens pulse to the next decade. A carry or forward signal to the next decade may appear only when the computing goes forward past step 0, but must be absent when the computation is to be backwards from 0. But a backward or reverse pulse must be transmitted to the next decade when the counting is backwards from step 9, which pulse should be absent when the counting is forward from step 9. These requirements are met by providing each of the tubes corresponding numerically to 9 and 0 with an individual control tube which simultaneously transmits the switching pulses to the next decade. The circuit is of such configuration that for advance counting tube "0" is energized by way of its control tube but for reverse counting is energized directly by the counting pulse, whereas tube "9" for advance counting is directly energized and for reverse counting is energized by way of its control tube. Such, control or stepping tubes may also be used directly for a forward and reverse counting electromechanical pulse counter. The control tubes are designated S*trad* and S*trsub* in FIG. 1.

The perforated disc L*s* is combined with the counter-index, for advising as to the value of the dispensed fuel oil or to indicate the amount to be paid, and is coupled to the counting meter roller. Disc L*s* is provided, as stated, with lamps L*a* and L*b* and the light-responsive photoresistors F*wm* and F*wk*, of which the former is to measure the used fuel at the post for cash customers and the second for generating the pulses applied to the computer for reverse or backward counting. Illumination of the photoresistors occurs through the perforations of the disc as the disc rotates. As can be seen in FIG. 1, lamp L*b* is disconnected as soon as the relay LR has actuated its contact *lr* lying in the lamp circuit. Obviously, instead of the perforated disc, a contact disc such as a printed circuit may be used for scanning which narrow contacts connected to an electronic shielded-contact relay may be used.

It has been mentioned that tube R1 extinguishes and tubes R*o* and V*oo* are energized after the subtraction has been performed in the counting sequence. This is accomplished by the use of the two half-wave rectifiers UT1 and UT2 by which the electronic computer is automatically restored to 0. The element UT1, operating as a valve, is connected with the cathode of tube R*o* and element UT2, also functioning as a valve, with the cathode of tube V*oo*. The purpose of elements UT1 and UT2 is to restore to its unoperated condition relay VR2 and to stop motor M when, after completion of the subtraction, tube V*oo* is energized, tube R1 is extinguished and tube R$o$ is energized because the potential of the cold cathodes of tube VR increases when pulses appear simultaneously at elements UT1 and UT2.

No errors can arise as the result of erroneous manipulation, and the actuation of a specific resetting key is not required. If, for example, one of glow lamps L1$a$ . . . L55$a$ is defective, alarm W$e$ is connected by contact L$k$; relay LR is deenergized and reverses its contacts $lr$, L$k$ and $lk$. The alarm is likewise connected in circuit when no line potential is applied in automatic positioning of the manual switch, or when service key T2 is depressed. It is here to be noted that key T1 and manual switch H1, H2, with its two positions, I$a$, II$a$ and I, II, is accessible only to the operating personnel of the station.

If a purchaser of fuel has inserted a sum in excess of the value of the fuels dispensed to him—after for one reason or another he must interrupt the supply of fuel—he actuates key T2. The service personnel is then in the position, as the result of the payment indicator at the post, and the illuminated tube, to determine the amount of money to be refunded. Then by actuation of pressure key T1, the electronic computer is restored to 0.

For the event that fuel is to be dispensed to patrons who pay for their withdrawals periodically, the installation may be supplemented by switch locks actuatable by keys, each such patron being provided with a lock individual to him and with an appropriate key therefor. Such a supplemental installation is shown schematically for a single lock in FIG. 4.

The switch lock, which comprises a test element S$ch$ actuatable by a key to be inserted, has two working contacts, $ak3$ and $ak4$, as also a relay MR and a counter RX. When the key has been inserted in the lock and been rotated therein, contacts $ak3$ and $ak4$ are placed in their circuit-closing positions, so that relays MR and RX are energized. Relay MR switches its contacts $mr$ so as to insert motor M in the circuit, disconnecting photoresistor F$wm$, and inserting photoresistor F$wk$ of the pulse generator including tube IR3. Relay RX is a counter registering the pulses transmitted by tube IR3 during a withdrawal of fuel. By displacement of a switch SK to a circuit-breaking position, the supplemental equipment, if required, may be rendered inoperative, as when further withdrawal of fuel is to be denied a patron. An electronic device, not shown, may be connected to the cathode of tube IR3, as well as a counter, of a type similar to known message counters, without requiring a special intermediate relay stage.

Figure 5:
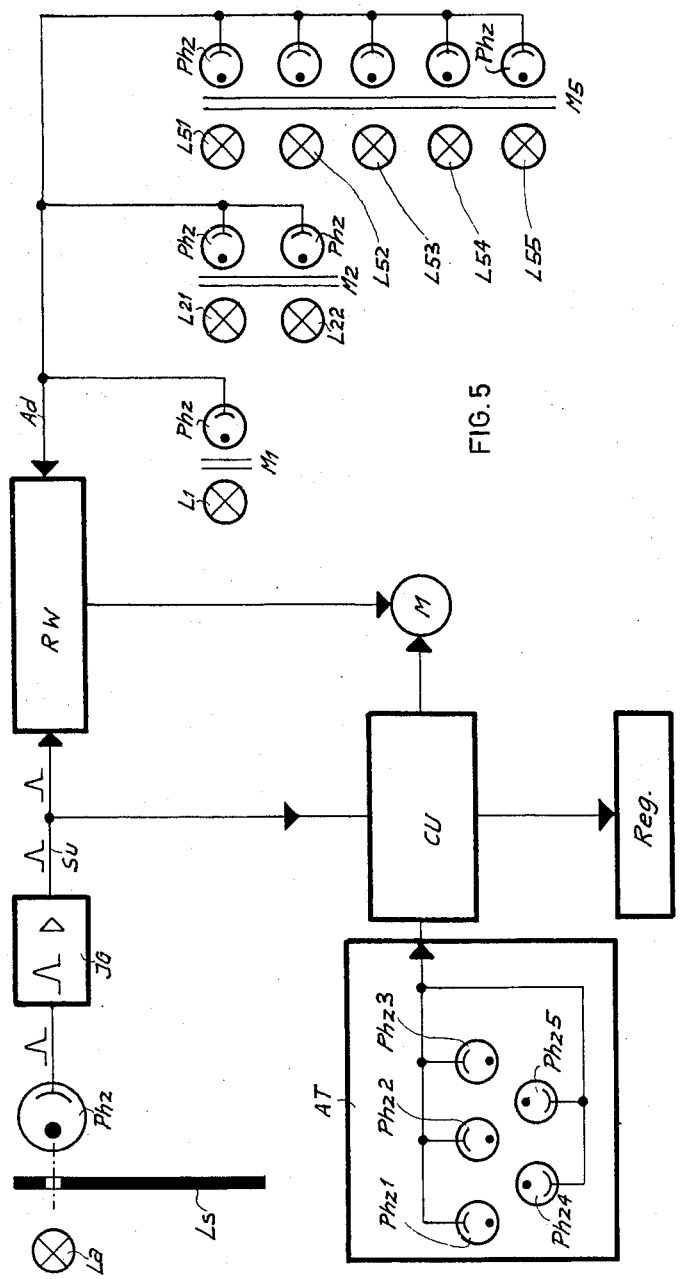

In dividual fuel withdrawals are also possible by means of an arrangement requiring perforated cards, or other strips of material with different arrangements of apertures for use by individual patrons. An installation with perforated-card control, coin-collecting mechanism, and a computer is shown schematically in FIG. 5, with FIGS. 6$a$, 6$b$ and 7, showing in simplified form details thereof, the use of a coin-collecting mechanism being optional.

As in FIG. 1, this installation likewise has three coin chutes M1, M2 and M5 which are in a cash register in which the inserted coins are tested for genuineness in known manner, the cash register also having a pulse generator consisting of lamps L1 . . . L55 and photocells P$hz$ connected to electronic tubes IR1 and IR2 whose the stepped pulses are applied to the electronic computer by line A$d$. In place of the photocells and tubes, other light-responsive elements and transistors or thin contacts with electronic contact protectors may be used. As shown in detail in FIG. 5, the test element is a perforated disc L$s$, or a contact disc, which is coupled with the counting mechanism in a fuel-dispensing post, and which serves as a generator of pulses resulting from the illumination of a photocell P$hz$, the pulses being transmitted to the pulse transmitter JG, provided, as in FIG. 1, with an electronic tube. The pulses generated by the pulse generator reach the computer RW by way of lead SU and a code translator CU which is explained below with reference to FIGS. 6$a$ and 6$b$. A scanning device AT for perforated cards and a register REG with counters are attached to the code translator. The installation includes an additional motor M for driving the pumps and the counting shafts. Other light-sensitive devices may be utilized in place of the photoelectric cells. The amplifier may consist of other known elements which may be used instead of the electron tubes.

The perforated card according to FIG. 7 has thereon twenty different combinations and is designated LX. It is divided into five vertical columns LK1, LK2, LK3, LK4 and LK5. The individual vertical rows, as has been mentioned, are so provided with perforations that twenty entirely different combinations of perforated rows are possible, thus enabling the issuance of twenty different cards to individual patrons. The perforations may be arranged in a single row but may also be in any number of rows.

The device for enabling the use of the perforated cards according to FIG. 6$a$ and 6$b$ has five electron tubes ER1, ER2, ER3, ER4 and ER5 of a code translator, each tube being associated with a photoresistor F$w$1, F$w$2, F$w$3, F$w$4 and F$w$5, which are preferably staggered in two rows, as is indicated schematically in FIG. 6$b$. The staggering and arrangement of the scanning can differ as desired for different patrons, and printed conductive plates and other known elements may replace the photoresistors. With these photoresistors, three glow lamps LI, LII and LIII are associated for their illumination, a device for receiving the perforated cards being positioned between the photoresistors and the glow lamps to produce individual illumination of the photoresistors through the perforations. This device is designated S in FIG. 6$a$ and is part of the scanning equipment. The anodes of the tubes are connected to a transformer T$r$, which can, if desired, be omitted; resistors WE1, WE2, WE3, WE4 and WE5, individual to each tube, are joined to the auxiliary anodes thereof from which further leads including additional resistors WE11, WE21, WE31, WE41 and WE51 extend to the transformer T$r$. The control electrode of tube ER1 is connected by a resistor WE12 to the photoresistor F$w$1. Similar connections are provided for the control electrodes of the other tubes by way of resistors WE22, WE32, W$e$42 and WE52, respectively, to photoresistors F$w$2, F$w$3, F$w$4 and F$w$5 which part of the scanning device for the perforated cards are tied to a common conductor which leads to another photoresistor F$w$6, from which there is a connection to a resistor W14 and a resistor W16, a branch connection leading from a point ahead of the photoresistor F$w$6 to the transformer.

The cathodes of the electron tubes are each connected by a respective relay, RI, RII, RIII, RIV and RV, to the transformer T$r$1. There is a further connection between the cathodes, on the one hand, over respective rectifiers G1I, G1II, G1III, G1IV and G1V to the transformer T$r$1, and, on the other hand, by way of respective capacitors CI, CII, CIII, CIV and CV to the resistors WE12, WE22, WE32, WE42 and WE52. To a secondary winding of transformer T$r$1 a rectifier G1 is connected in a Graetz circuit whose output is connected by one lead to a relay R$e$1 and by another lead to a switch S, thus, to the device for receiving the perforated card. A manual switch H is connected to device S, which in one of two possible positions completes a connection by way of a resistor WH6 with relay R$e$1. With this arrangement, the manual switch may be disconnected in one switching position while the three series-connected lamps LI, LII and LIII are in circuit, which takes place automatically each time a perforated card is inserted into device S. The relays may also be connected to the anode lead.

Figure 6A:
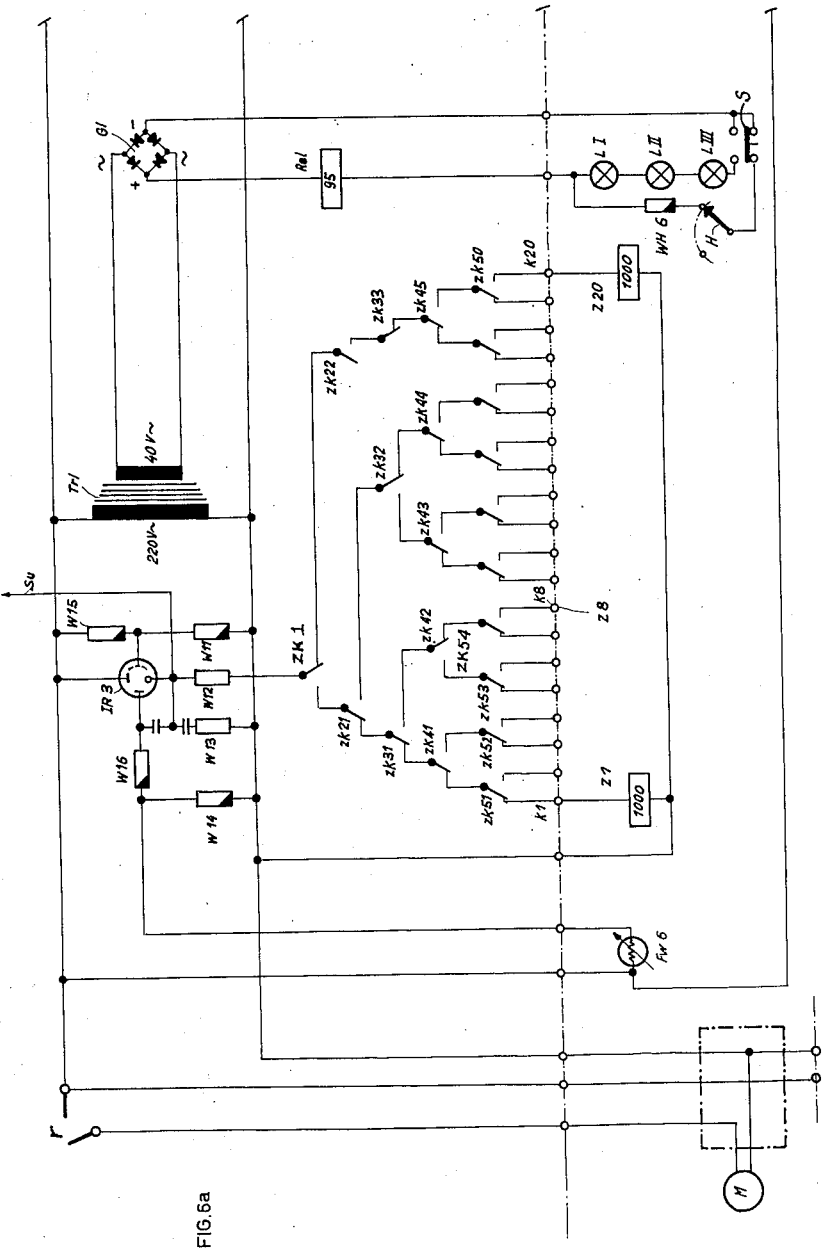

Relay contact $r$ of relay R$e$1 serves to close the circuit of motor M (FIG. 1). As shown in FIG. 6$a$, a pulse generator including pulse tube IR3 according to FIG. 1 is provided, which may be identical with the generator for reverse counting. The circuit arrangement also includes twenty counters, Z1 ... Z20, connected to terminals $k1$ ... $k20$, which may be inserted into circuit by way of contacts $zk1$, $zk21$, $zk22$, $zk31$ ... $zk33$, $zk41$ ... $zk45$, $zk51$ ... $zk50$ when pulses from the pulse-generator tube IR3 are to be transmitted to the counting mechanisms. Control of these contacts is by relays RI ... RV, with which they are associated, in particular contact $zk1$ being actuated by relay RI, contacts $zk21$, $zk22$ by relay RII, etc. FIG. 6a shows the contacts when the relays are without current.

If, for example, perforated card No. 1, having one aperture, is inserted into the card-receiving device S between photoresistors $Fw1$ ... $Fw5$ and lamps LI ... LIII for their illumination, after the installation has been put in operative condition, tube ER1 is energized and thereby relay RI is operated, which connects the cathode of pulse-generator tube IR3 by way of the cathode resistor W12 thereof over counting contacts $zk1$, $zk21$, $zk31$, $zk41$ and $zk51$ to counter Z1, so that the pulses transmitted from the pulse-generator tube reach counter Z1, the number of these pulses corresponding, by the use of a rotating perforated disc, not shown, to the value of the fuel dispensed, similar to the illustrative embodiment of the circuit configuration shown in FIG. 1. If desired, however, the pulses may be transmitted through the connection $Su$, connected to the cathode of tube IR3, to the computer. If now perforated card No. 8 with three apertures, as shown in FIG. 7, is used, this results in the energization of tubes RI, RIII and RV, and the preparation of a connection from counter Z8 into the circuit by way of contacts $zk1$, $zk21$, $zk31$, $zk42$ and $zk54$ to the cathode of pulse-generating tube IR3 of pulse-generator JG.

In the embodiment of a supplemental mechanism for control by perforated cards shown in FIGS. 6a, 6b and 7, such mechanism is shown for utilization with up to twenty different cards. The number of cards can, with appropriate construction of the encoder CU, the scanning mechanism AT and the register R$eg$, be selected smaller or larger, and in place of the scanner using light, an electro-mechanical scanning means may be used.

Figure 8:
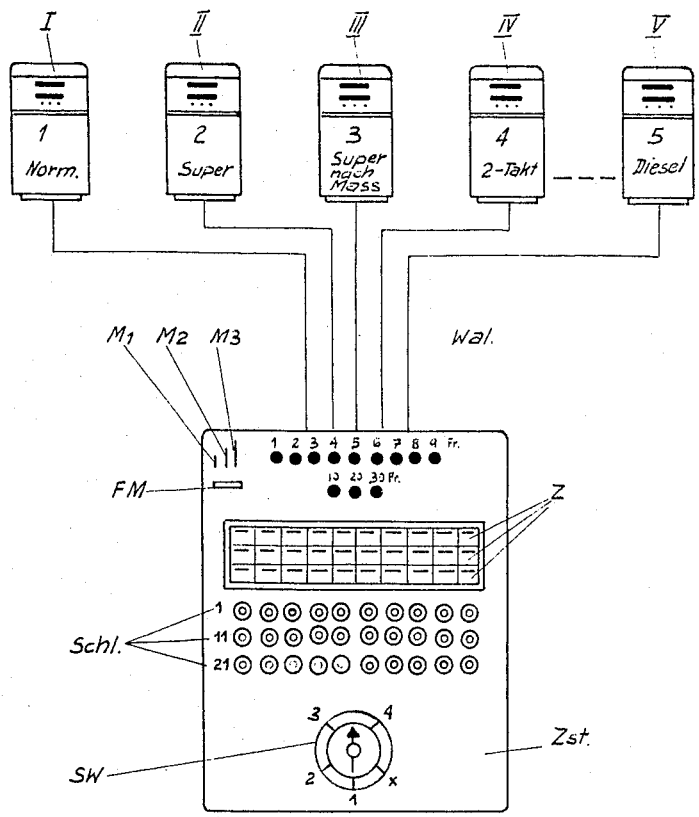
FIG. 8 shows the external organization of a service or gasoline station equipped with my improved control mechanism.

The installation may also have centralized remote control for any desired number of fuel-dispensing columns, with possible simultaneous dispensing from two or more columns. FIG. 8 shows an installation in which a central control and recording station Z$st$ is provided with three coin chutes M1, M2 and M3, along with a return mechanism for spurious or abnormal coins. To indicate the particular sum inserted, as well as the excess payment for fuel not withdrawn, small glow lamps W$a1$ are provided. By use of appropriate counting tubes, the amount can be read out. Also provided is a plurality of counters Z and a number of insertion locks S$ch2$ for the insertion of keys according to FIG. 4. There may also be provided a position for the insertion of perforated cards or strips with the required scanning means. To this device are attached five fuel columns I, II ... V, for five different types of fuel; the number of fuel columns may be varied as desired. In accordance therewith, there is provided in the mechanism a column selector SW having five different positions which is set by the patron in accordance with his particular requirements. If there is simultaneously the possibility that more than one patron can withdraw fuel from different columns, the mechanism would have to be constructed accordingly and have more than one column selector.

The use of cold cathode tubes enables immediate functioning of the installation when actuated since this type of tube has a short response time. Circuits using such tubes are relatively simple and the current consumption is small in that the tubes require no control energy. The elements required for the circuit may be in the columns or housed separately, and can each be installed at convenient points. The counters already present in the columns continue to be used. No difficulties or impairments are encountered in the computers of the dispensing columns because no contacts are involved. Because there are no mechanically interconnected elements, installation independent of the columns is possible. The elements required for the circuit are few and installation thereof is particularly simplified when printed circuits or insertable elements are used. Insertion of the coins may be in any desired sequence of denominations even while withdrawing fuel, irrespectively of the price of the fuel.

Further illustrative embodiments for electronically checking the test elements and the arrangement of the means required therefor in the complete self-service installation are described below.

FIG. 9 discloses a test element in the form of a hollow cylinder whose inner and outer enveloping surfaces are provided with cams, pins, or electrical contact layers which may be scanned by appropriate contact parts of the electronic station. By the inner contact arrangement the identity of the particular patron is determined, and on agreement of the contact information imparted by insertion of the test element with the corresponding data stored electronically, the dispensing means is unlocked. The hollow cylinder may be inserted in various angular positions into the input of the electronic arrangement of the particular station so that the pins, cams, or other contact surfaces provided on the outer surface of the hollow cylinder, in definite relative positions, may be brought into agreement with the corresponding contact portions, or scanning elements, in the input. By so doing, the fuel-dispensing column designated $1-x$ may be selected, e.g. a particular column of a fuel station for gasoline, high-test gasoline, diesel fuel, oil, or the like; combined dispensing is also possible to produce mixtures from several dispensing columns simultaneously.

FIG. 10 shows a card-shaped test element on which there is a printed circuit G for identifying the patron. In addition the card has a number of perforations Lo in a definite arrangement which may be used to identify the patron by mechanical or photoelectric scanning. Ha is an aperture for hanging the card up.

FIG. 11 shows a test element, likewise in the form of a card, in which magnetic subminiature cores are inserted in such manner as not to be visible from the outside. The cores are arranged along the abscissa at different ordinate spacings in such manner as to result in position values resulting in the number 200,009 in the coordinate system, which identifies the patron. Scanning of such card is by means of coils disposed in the electronic scanning means. In scanning, a sequence of pulses results which is characteristic of the number contained in the card. If desired, the information readable from the card may be stored in the form of a nondecimal or any other code.

FIG. 12 shows a further test element in card form; on this one there are recorded a series of sinusoidal or pulse frequencies—in fact, a single frequency suffices—in wave or amplitude form, which can be scanned magnetically, photoelectrically or even mechanically. Preferably the frequency is in the audio or sub-audio range. But higher frequencies and even high frequencies can be used, if the scanning means are properly constituted. Both the magnitude of the frequency and the duration of a wave train, as well as the number of pulses in a pulse sequence, may be used for identification.

FIG. 13 discloses a card-type test element provided with a circuit element, for example a capacitor or a remanence, or as here shown with an inductor, determining the frequency of an electrical oscillator, which for testing is inserted into the oscillatory circuit of an electronic scanning means. A particular frequency is assigned to each patron of the dispensing station or to each digit of his identification number. Such coil likewise is appropriately not externally visible on the card so that the test element cannot be duplicated by parties not entitled to use of the card.

In another system, a magnetic amplifier (transducer)

is so modified by the insertion of a piece of metal that an output potential or pulse sequence is produced whose magnitude corresponds to the patron's number. The two embodiments of FIGS. 10 and 12 with a plurality of identification means are particularly adapted for the combination of individual identification with a credit rating for the goods to be withdrawn from the self-service stations.

With reference to FIG. 14, the sale of gasoline by use of credit ratings with electronic scanning will be described. S1, S2 and Sx are a series of columns for dispensing gasoline. Kx and Ky diagrammatically represent two patrons, patron Kx paying by cash and patron Ky by by credit. Before patron Ky withdraws any material, he pays a certain amount of money Zy to the gasoline company and receives from the company credit certificates Gu on which the amount paid in is given in the form of quantity statements of the desired material, for example in the form of gallons, or the amount paid in is stored in code form, for example in the form shown with any of the embodiments of FIGS. 10 to 13, and subdivided in the form of the smallest payable units. These amounts may be canceled either when scanning takes place or simultaneously with the delivery of the material in accordance with the use of the credit. Such cancellation is simplest when the test element is in the form of a magnetic register. It would also be possible to cancel the strip by cutting it off at such region or providing it with apertures directly over the stored information, thereby destroying it. The perforations could be printed directly in the form of digits so that the patron can see how much of his credit he has consumed. In addition, the permanent patron Ky may receive an identification number which likewise may be stored in the test element in non-erasable form. Two different storage elements may be provided for identification and for the credit rating. Preferably when the credit rating has been reduced to a predetermined residual amount, which, for example, may be for the purchase of ten further gallons of gasoline, an alarm indication may be stored therein which when scanned operates an acoustic and/or optical signal so that the customer will know how much gasoline he can still purchase with his remaining credit.

When purchasing gasoline the credit standing and the identification card or cards are inserted into the scanning control mechanism AB, and are again removed after use. By mechanism AB, the gasoline delivered from column Sx is controlled.

Customer Kx pays his money Zx into a coin receptacle Mu and receives his credit card from a scanning and control mechanism A'B', where it is likewise scanned and cancelled to the extent that this customer withdrew gasoline from column S1 or any of the other column Sx. Customer Kx may, however, use the described mechanism only for obtaining a credit card which he does not immediately use but which he utilizes only in the next gas station by inserting it into the scanning and control mechanism there located.

At each of columns SI . . . Sx, or in common to all of the columns, a control station St—St is connected which with the aid of a computer determines the amount of the monetary value of the dispensed goods, particularly of the gasoline, and which actuates the scanning and control mechanism A'B', and AB for a reverse count to print the quantity of consumed goods (gasoline) on a control slip, which can be removed by the customer from the control station, and in addition a duplicate of the removed slip is collected so that the gasoline company BG can be notified.

FIG. 15 shows a modification of the cash/credit self-service equipment shown schematically in FIG. 14. In FIG. 15 five columns respectively for ordinary gasoline, high-test gasoline, gasoline mixtures and diesel fuels are shown. A common control station St—St is connected to all the columns and is provided with a plurality of insertion apertures Sch, whose number corresponds to the number of columns, for the test elements which may be either identifications or credit standings, or both. In addition, each column is provided with chutes for the insertion of coins. In control station St—St are installed the mechanisms for scanning the test elements and for controlling the delivery of fuel, a computer for determining the amount of money expended, a memory device, and equipment for applying and measuring the pressure of the gasoline, for determining the monetary value of gasoline delivered, and for cancelling the credit of the credit card, a delivery mechanism for the printed control tickets Ktr, as well as the necessary control, security and signaling devices, all joined in a unitary structure.

A further simplification of the self-service installation, particularly for gasoline stations, is shown in FIG. 16. Since in the control equipment, the monetary value of the dispensed fuel is required to be measured in any event for bookkeeping purposes, the individual dispensing columns with their relatively expensive computers may be entirely omitted, and only dispensing valves and pumps are connected to the fuel-storage tanks, the pumps being controlled by the control station. T1 and T2 indicate two tanks for normal gasoline and high-test gasoline distributed to delivery points H1 . . . Hx by means of pumps P1 and P2 driven by motors M1 and M2. In the individual gasoline lines, two flow meters DI . . . Dx are provided whose rotations electrically drive the metering and computing equipment in the control station. The signals for the commencement and termination of gasoline delivery are transmitted by electronic valves EV1 and EVx and an electronic mixing valve EMV, likewise controlled by the control station. The individual tapping points are selected at the control station by selector switches W1 and Wx, and in this illustrative embodiment the desired number of gallons may be controlled by the setting of a lever.

In the embodiments hereinabove described, provision is made that the dispensed fuel is paid for in advance by the customer and that the required steps of testing, metering and controlling and the necessary computation and registering steps be performed by the control station at the place where the dispensing of the fuel takes place. It is, however, possible that the sale be made without cash either so that the monetary totals registered at the control position, of which the gasoline company receives a copy, be paid subsequently or that a larger amount be paid for the account of the buyer to the gasoline company or to the selling company and the individually recorded sales amounts be deducted. Particularly in these cases of non-cash sales—but also in the prior-described sales for cash or by credit cards—the subject matter of this invention may take the form that at least a part of the electronic equipment of the control station, particularly that for the booking and computing of changes to the customer, may be installed at a central station at the premises of the seller, for example, the gasoline company, and be connected to the selling station by communication transmission lines, the scanning of the identity cards or other test elements in such arrangement, as also the control of the dispensing steps of the gasoline to be sold, being carried out, as before, at the place of sale.

Where an account is set up at the selling company, not only is the customer's identity and right to buy examined by scanning of the test element, but simultaneously and automatically by means of electronic equipment there is determined to what extent the desired gasoline is still covered by the money remaining to the credit of the particular account. If desired, the then status of the account or the deficit sum can be rendered visible by communication lines at the control post of the dispensing station, so that the customer may be enabled to pay the balance, or, in the case of unreliable customers, delivery of gasoline on exhaustion of the account may be refused.

In FIG. 17, by way of example, there is schematically disclosed such a central charging, booking and registration system for gasoline station operation of a gasoline company. Ztr indicates the central charging, booking and registration station at the main office of the gasoline company which is connected by communication lines, for example, telephone cables, with the individual gasoline station in the country. This type of centralization has not only the advantage of uniform and non-cash charging to the customers but also the additional advantage of continuous supervision of the state of the merchandise to be dispensed, particularly gasoline and oil, or the like, so that the amount thereof to be delivered to the particular stations for resale is continuously controlled and known at the central office. It is further to be noted that dispensing of gasoline at gasoline stations has been given primarily by way of example. The invention, however, relates to the dispensing of all kinds of merchandise, for example at supermarkets, department stores, cigarette-vending machines, restaurant operations with automatic delivery of foods, etc.

In the following there will be described a particularly appropriate method for scanning test elements and identifying the customer's number by means of a metering device having a plurality of ranges of sensitivity and at least one indicator in the range of whose deflection a localizing probe is used to determine the position of the indicating element. A particular feature resides in so constituting the system that the result of the measurement is obtained in numerical form with a predetermined number of digits, which may be directly printable, with repeated readings taken in the different sensitivity ranges of the metering device wherein for each measurement integral values of the indicator readup are determined and are applied to a memory for storage and further evaluation.

In accordance with a further feature of the invention the apparatus for performing the method is characterized in that the indicator, with the localization probe capable of being positioned in any desired position on the particular sensitivity range, may be connected to a source of potential and to an electric pulse counter, separated from the measuring circuit controlled by the movement of the indicator, at predetermined discrete positions, the indicator playing the role of a limiting switch for the duration of the counting. The electrical pulse counter may itself be in the form of a memory, for example, a printing mechanism, in which the individual digits for each measurement are stored and which remain stored until the last digit is stored and thereupon can be actuated as a unit to print the result of the measurement, or the counter may cooperate with a special storage device, for example a magnetic memory, and store therein the individual digital values.

The stored values may be read either at the site of the equipment or by means of at least one communication signaling line at a location remote therefrom and used for switching purposes, for example. Combinations of these are possible, e.g. one or more printing mechanisms at one or more other sites together with a storage medium to be scanned to obtain the final results.

Still a further feature may provide that with continuous metering of individual items their measured digital values are stored in the memory device, depending upon whether they lie in digital ranges above or below at least one predetermined limiting value itself included in one of the two adjacent ranges are used for actuating specific control steps by which the measured items, in accordance with their allocation to one or the other digital range, during their movement away from the metering site are sorted by an ejecting mechanism into different containers.

The metering may be carried out so that one and the same item to be measured is successively measured several times with different sensitivities of the metering device or that several different items to be measured are successively measured with different sensitivities of the meter, each item being tested but once. In the last-mentioned case, the method of the invention enables the coding and decoding of information consisting of information bits, in the form of items to be measured disposed on at least one carrier, so correlated to the sensitivity changes of the meter and standard units connected thereto that, on measurement of the different items, with connection of at least one standard unit to the meter, the changed sensitivity thereof results in an array characterizing the information in rational relation to the measuring values applied continuously to the storage medium. The stated correlation between the items to be measured and the standard units is appropriately of such character that on performing each series of measurements a series of integral measuring values results.

Further details are shown in FIG. 18 to 21 in which, see FIG. 18, $mA$ indicates a milliammeter of substantially conventional type whose indicator needle carries a plate F. In the deflection path of the indicator ten photoresistors, 1 ... 0, are disposed and illuminated by a light source, not shown in the drawing, so that a given time one of the photoresistors is at least partially covered by plate F. The dimensions of the individual photoresistors as also the spacings between them, and the size of plate F, are so chosen that, on deflection of the milliammeter, one and only one photoresistor is covered by plate F as that the resistance of the photoresistor is changed. The circuit of the milliammeter comprises the driving coil thereof, not shown in the drawing, a battery B, the measuring resistor MS whose resistance is to be measured, a switch DeK.W1 which has ten contact positions, and the inserted one of the biasing resistors RS. The individual resistor RS are of such different magnitudes that, depending on the position of switch DeK.W1, the sensitivity of the milliammeter MA is changed tenfold. In this connection it may be noted that the series circuit of the resistance to be measured, and the particular resistor RS inserted to change the sensitivity of the milliammeter shown in the embodiment of FIG. 18, may be replaced by a corresponding parallel circuit.

One of the photoresistors may be connected, by way of a switch ZS hereinafter designated as the "digit finder," in parallel to a switching tube SR, lying in series with a relay ZR, hereinafter called the "counting relay." The inserted photoresistor forms a potential divider with the fixed resistor R, which is in shunt with the ignition gap of switching tube SR. For the initial ignition of switching tube SR a contact J is provided and a capacitor C is connected across the ignition gap. Relay ZR has a plurality of contacts $Zr1$, $Zr2$, $Zr3$ by the closure of which additional relays DEKW and ZS2 are connected to a 60-volt supply. These relays are associated with decade-selector arms DeK.W1 and DeK.W2 and the digit-finder arm ZS, which with those relays function as a stepping-switch mechanism.

The mode of operation of the circuit arrangement is as follows. Upon connection of the resistor MS to be measured to the terminals of the meter $mA$, switching tube SR by a temporary closure of starting contacts J is caused to ignite, whereupon relay ZR is traversed by the line current. Ignition of tube SR effects the operation of decade-selector relay DeK.W; as a result each of decade-selector arms DeK.W1 and DeK.W2 is advanced a step. This establishes the lowest-sensitivity range of the meter and the first measurement of the magnitude of resistor MS commences. Thereupon the measuring steps are such that the milliammeter is supplied with battery current, from the positive side of battery B through decade-selector arm DeK.W1, bias resistors RS, the resistor MS being measured, the driving coil of milliammeter $mA$ back to the negative side of the battery. As a result of this the indicator of the milliammeter is deflected, to an extent depending on the magnitude of the resistance of resistor MS being measured, and remains, for example, stationary over the photoresistor 6, thus interrupting the light beam from the light source impinging on this photoresistor. After a predetermined time, determined by a delay means not shown in the drawing, relay ZR by its contact Zr1 actuates a pulse generator IG, likewise connected to the 60 v. potential source, opening and closing a contact ig. Thereby the digit-finder arm ZS is periodically, and in the same rhythm, advanced stepwise by relay ZS1 until arm ZS has engaged that one of the photoresistors which is covered by plate F, that is, in the illustrative example, photoresistor 6. During this operation executed by digit finder ZS, and following the connection of pulse generator IG, switching tube SR has become extinguished, and furthermore the decade-selector contact Zr2 had opened upon completion of the first step of contact arms DeK.W.1 and DeK.W.2. Upon the establishment of the contact of digit finder ZS with the photoresistor 6, switching tube SR again is ignited. To this end the individual photoresistors in their illuminated and nonilluminated conditions, and the voltage-divider resistor R, are so related to the ignition potential of the switching tube that the latter can ignite only when a nonilluminated photoresistor is connected in circuit. By the ignition of switching tube SR, relay ZR is again supplied with current thus causing each of decade-selector arms DeK.W.1 and DeK.W.2 to be advanced an additional step, and simultaneously relay ZS2 is energized by contact Zr3 whereby digit-finder arm ZS is again restored to zero. Finally, pulse generator IG is again connected and switching tube SR is again disconnected. This sequence then repeats itself anew; the digit-finder arm is advanced until it has reached the position occupied in the next sensitivity range by plate F. The control pulses from pulse generator IG effecting this advancement, which define the particular digital value of the magnitude of the resistor being measured in the sensitivity range inserted by the decade selector DeK.W.1, are simultaneously stored by decades in a memory which likewise has been stepped by decade selector DeK.W.2. In accordance with the illustrative example, this memory comprises a digit printer with nine digit discs ZD for the units, tens, hundreds, etc., which are connected in steps synchronous with the individual steps of the decade selector DeK.W.1 by decade selector DeK.W.2 and each individually synchronously rotated in steps by the pulses from the pulse generator, by which the digit-finder arm ZS is also advanced, so that each digit disc at the end is set at the number sought by the digit-finder arm ZS. The digits can then be printed either individually at the end of a measuring and finder sequence or simultaneously at the conclusion of all of the measuring and finder sequences as the total numerical result.

The pulses from pulse generator IG are transmitted to the memory, specifically to the printing means, by way of contact ig2. Furthermore, at St there is indicated that control pulses may also be transmitted from the memory to other points, as by communication lines, and be utilized for any desired control purposes. These control signals may, as desired, be transmitted individually after each individual measurement, or at the end of all measurements as information to a second printing means.

Upon termination of all the measuring steps and particularly after the printing or other registration of the results of the measurement and transmission of the required control pulses, the arms of the decade selector are again restored to zero. The metering mechanism of the above-described type, directly delivering measurement results in the form of digit positions, may thus be designated a "digital meter," and can be used for the most varied purposes, specifically, for example, to measure potentials, resistances, efficiencies, outputs, revolutions per minute, loss angles, frequencies, pressures, levels, as well as for corresponding controls thereof, with or without large indicating devices, registrations and remote control, with the pulses transmitted directly over telephone lines. Such instruments can also be utilized as multiple meters or regulators. In a multi-analog-digital meter, for example, pressures, speeds or temperatures of different metering points may be stored directly and digitally as numbers, or as perforations in perforated cards, or stored magnetically as magnetic information in magnetic tapes, and/or in written or printed form. The measured values can also in simple manner be rendered visible on illuminated tables or other optical devices. In rated-value meters, deviations from rated values may readily be set or determined in percentages by making the width of plate F of the embodiment of FIG. 18 adjustable to vary the width of the scanning beam. In the stated manner, for example, resistors, inductors, capacitors and other circuit or structural components may be automatically tested for deviations from their rated or desired values and, if desired, be automatically sorted. In the meter provisions may be made for changing the measuring range. Even negative values can be determined by appropriate circuit expedients. To determine, for example, the limiting measurement values for sorting, the printing mechanism of the illustrated embodiment may readily be used by providing, on the periphery of each digit disk, contacts which are actuated and initiate a control sequence at that moment when a predetermined digit of the digit gear, or some other mark or cam on the digit gear, passes this particular contact.

Another field of use for the method of the invention described with reference to the embodiment of FIG. 18 consists, not in the successive measuring of a single item in different sensitivity ranges of the meter, but in testing in each different sensitivity range a different one of the items to be measured, for example the electrical resistance thereof. In such mode of use, the mechanism shown in the above embodiment may be used as an encoder. Hence, the system may be so designed that the mechanism is a universal instrument capable of use for both methods. It is also possible, and for many fields of use advantageous, to provide two different mechanisms which, while being substantially alike in their circuit arrangements, are provided with different terminals for the items to be measured; namely, in one case for measuring a single item a plurality of times in succession, and in the other case for the connection of a system of like items to be measured, which are to be connected one after another to the meter in the course of the measurement procedure.

The latter case is illustrated at the left in FIG. 18. Nine electrical resistors RK1 . . . RK9 are arranged on a card K, in the form of a printed circuit in the illustrated embodiment. Upon insertion of the card K into a slot of the measuring meter, all resistors RK1 to RK9 are simultaneously connected to the various resistors RS, so that nine different circuits result as shown in the figure. This presupposes, however, that the measuring resistor MS, which is utilized in the above-described mode of operation, be first removed and that the electric circuit remains open at this point.

Let us consider the case in which the resistors arranged on card K, by their individual magnitudes represent the individual digits of a telephone number. In this case, the encoding principle is as follows: Each resistor RK1 etc. on the card, together with an always present biasing resistor RS in the equipment to which it is connected, expresses a definite digit, each decade requiring a particular resistance value. The resistor RK1 etc. on the card is always coupled with its associated resistor RS according to a code so that, for the same digit in each decade, the same deflection of the ammeter indicator takes place. This is accomplished in that, although the magnitude of the card resistor may vary widely, the series connection to its associated resistor is such as always to make the total resistance the same in each decade. For example, the resistance for digit 2 in the first decade is 90 kilohms, in the second decade 80 kilohms, in the third decade 85.3 kilohms, in the fourth decade 83.2 kilohms, etc. The code may be so selected that even when the telephone number is known, the relation thereto of the resistor group representing the number cannot be determined. Thus, FIG. 18a is a table showing the arrangement of the code resistors and of the resistors in the equipment for the situation where, in each individual measurement, the deflection of the indicator is to be equal for a given digit. The coding may, of course, be rendered more complicated by having the deflection of the ammeter pointer in the various decades differ in magnitude.

FIG. 19 discloses an illustrative embodiment for the scanning beam between the metering equipment and the light-responsive elements. Whereas in the schematic showing of the beam path of FIG. 18 is was presupposed that by the indicator deflection the particular light-sensitive element was to be covered, that is, the path interrupted, in the embodiment of FIG. 19, on registration of the indicator means with the light-sensitive element, irradiation of that element takes place. These changed conditions require that the dimensioning of the tube circuits be adjusted thereto, so that the desired operation will remain unchanged. In FIG. 19, the metering equipment is likewise an ammeter and has been designated M. In the instant embodiment, the indicator is a mirror S which directs a beam from source L, rendered parallel by lens Li and a diaphragm B1, by way of a reflecting mirror to an array of photodiodes F. The basic measuring and switching sequence remains the same as that used in the embodiment of FIG. 18. The embodiment of FIG. 19 may be further modified in that the light source itself, or the light-sensitive element may, be positioned on the rotatable coil of the ammeter, and that to fix the individual adjustments of the indicating element at well-defined positional magnitudes, in the range of possible deflections, diaphragms are disposed in the light path in place of the photodiodes shown in FIG. 19.

In lieu of this monitoring system to determine the value of the individual deflections in the various decades, the deflection of a movable element may be used directly for measuring. In such modified system, measurement may be in a single decade, or the excess on reaching a predetermined digit may be carried over to the next decade. The particular configuration of the movable parts of the measuring equipment, as well as the materials of which they are made, may be as desired and different. Reading may be from slits, apertures, or contours, or by direct viewing of the calibrations. Where the reading is by photoelectric means, it is appropriate to use one or a plurality of stroboscopes.

Figure 20B:
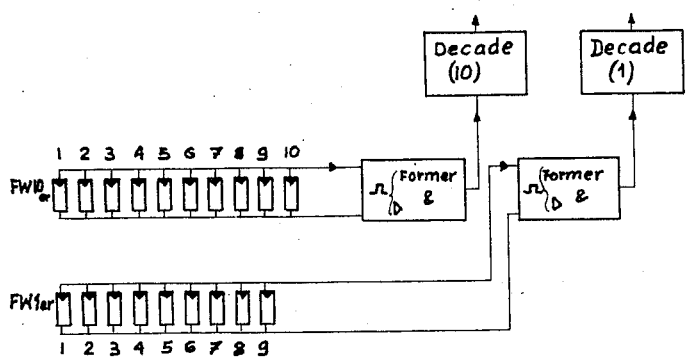

FIG. 20 schematically discloses an indicating element enabling the counting in separate decades and with use of a covered zero region of the measuring equipment. For each decade individual light-sensitive elements may be provided. While in FIG. 20 the movable portion of the indicating means itself is shown, in FIG. 20a there is shown the arrangement of the photoelectric cells or the light-sensitive resistors for the units and tens position. FIG. 20b schematically shows the circuit thereof. The arrangement may be expanded in like manner to more than two decades. The operation of such arrangement with covered zero region, in which the movable indicator rotates several times through 360°, is as follows: In the rest position the zero mark of the stationary portion and the zero mark of the movable portion cover each other. If now the indicator moves, the first mark for the unit falls in the region of the first light-sensitive element, that is the digit 1. Thereupon this first mark sweeps over digit 2, etc., until upon further rotation the first units mark reaches the digit 0. Simultaneously with attainment of the latter digit by the first units mark, the zero mark for the tens is positioned at the light-sensitive element of the stationary portion for the tens. In these two individual decades, the number 10 is thus directly visible. This sequence continues until the indicator comes to rest. Hence, the position of the indicator may be directly read or printed.

Rather than directly counting the deflection, the indicator distance of deflection may be read. To do so, a monitoring position is required for each decade, that is, each decade is individually examined. If, for example, the indicator is positioned between 4 and 5 in the tens decade, both the units and the tens decade may simultaneously be examined. In such system of examination, the tens mark is made so long (as shown in the broken lines "Tens" in FIG. 20) that the tens division is covered until such time as the units decade reaches digit 9. Thus, in the example, the light-sensitive element for digit 4 is covered and dark from 4.0 to 4.9 and, after four pulses, the decade selector of this decade remains stationary. Simultaneously, examination of the units decade may be had. If the indicator is positioned at 49, the switching tube after nine pulses ignites the examining selector.

Figure 21A:
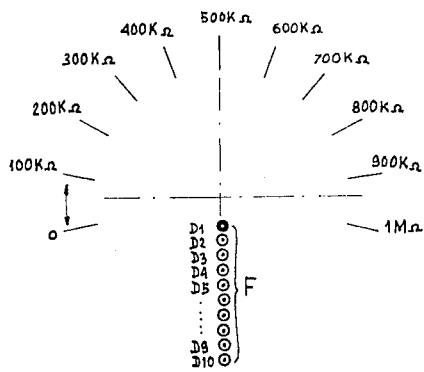
Figure 21B:
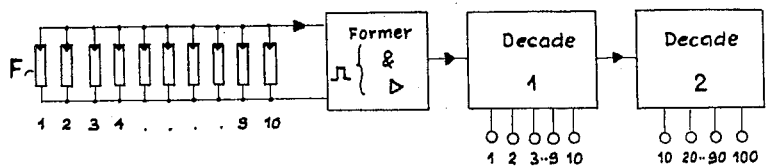

A further embodiment is schematically shown in FIGS. 21, 21a and 21b. The measuring principle here involves does not differ substantially from that of FIG. 20 as described above. The main difference is that the pulses are not counted in individual decade manner, but are counted continuously. The marks of the movable portion 0–100K, 101–200K, 201–300K, etc., successively sweep over diodes D1 ... D10. Binary systems may also be read out, that is, instead of the counting elements being in decimal form, other prior selections may be made in respect to these, so that any desired system may be used, or after a predetermined number of pulses there may be executed an order to substitute another system. There are various commercially available types of pulse generators, decimal counters, and binary counting mechanisms which can readily be used for these purposes.

The individual elements used in the above-described illustrative embodiments may, in accordance with requirements, be of types and configurations different from those shown and described. Highly sensitive, weak-light measuring equipments, galvanometers, vibration galvanometers, or frequency meters, electrostatic devices, etc., can, for example, be so equipped that the measured values may be directly read out in digital form.

In the embodiment of FIG. 19, by the use of optical means, such as diaphragms, the light beam may be projected in point shape or as a linear stripe on the light-sensitive elements. If the projected light beam is sufficiently long, the photo diodes may be arranged at an inclination to each other. By so doing, many scanning elements are accommodated in a small space and hence high digital precision is obtained in the read-out operation. Furthermore, so that not too many light-sensitive elements are required in the meter, the reflecting mirror on the suspension wire of the instrument may be of such construction as to reflect a plurality of very thin stripes.

The reflection is of such type that with the beam of light falling upon the last of the series of photoresistors, or other light-sensitive element, the next light beam as a new mark simultaneously impinges on the first photodiode, thus producing continuous counting and measuring.

So, also, the various contactless circuit-closing elements, represented by photoresistors in the embodiments illustrating the invention, may be replaced by other, and not necessarily light-sensitive, elements which produce contact by electromagnetic or electrostatic means. For the switching tube a cold-cathode tube is appropriately used, or a corresponding semiconductor element such as a transistor, or a magnetic modulator.

As has been mentioned, the measuring mechanism of the invention not only is utilizable advantageously as such in laboratories, testing stations and manufacturing plants, but has a prime field of use for coding purposes, encoders, decoders, switching and control means for automatic vending machines, into which parties entitled to access insert an identification card or key, etc., of a type like card K of FIG. 18, to initiate a sequence of control operations by which the merchandise dispenser of the automatic vending machine is opened.

What I claim is:

1. An automatic self-service mechanism for the delivery of dispensable merchandise to customers of established credit rating, comprising:

normally inoperative dispensing means for merchandise to be delivered;

test means adapted to receive a customer-identification element having indicia individual to a particular customer, said test means being responsive to said indicia for rendering said dispensing means operative;

signaling means coupled with said dispensing means for producing information on the cumulative value of merchandise delivered;

a plurality of storage devices adapted to receive said information;

and selector means controlled by said test means for directing said information to a particular one of said storage devices determined by said indicia.

2. A mechanism as defined in claim 1 wherein each of said storage devices includes means for comparing said information with a credit balance maintained by a customer respectively identified with such storage device and means for blocking said dispensing means upon exhaustion of said credit balance.

3. A mechanism as defined in claim 1 wherein said test means comprises a source of operating current, a current-responsive instrument and circuit means for connecting said instrument across said source together with an external impedance constituted by a part of said customer-identification element, said indicia being the magnitude of the impedance of said part.

4. A mechanism as defined in claim 3 wherein said test means further comprises means for progressively varying the sensitivity of said instrument whereby the latter produces a succession of outputs in different ranges respectively indicative of different digital positions, said selector means being responsive to multidigit numbers represented by said succession of outputs.

References Cited by the Examiner

UNITED STATES PATENTS

| 2,353,002 | 7/1944 | Armbruster | 194—4 |
| 2,792,148 | 5/1957 | Goldenberg | 194—4 |
| 2,839,173 | 6/1958 | Loew et al. | 194—.02 |
| 2,907,435 | 10/1959 | Oakes | 194—4 |
| 2,977,024 | 3/1961 | Harris | 194—4 |
| 2,995,229 | 8/1961 | West | 194—.02 |

FOREIGN PATENTS

| 877,716 | 9/1961 | Great Britain. |
| 880,111 | 10/1961 | Great Britain. |

LOUIS J. DEMBO, *Primary Examiner.*

LAVERNE D. GEIGER, ERNEST A. FALLER,
*Examiners.*